July 1, 1941. W. H. FOLEY 2,247,806
FISHHOOK
Filed July 22, 1940
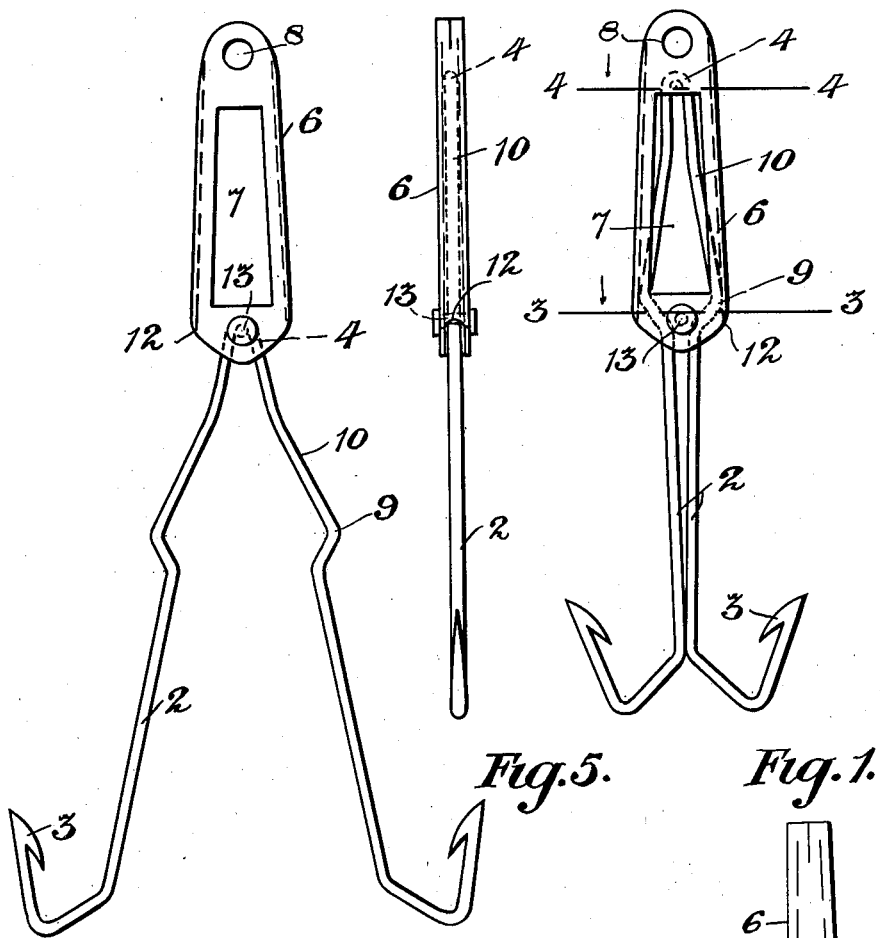
Fig.5. Fig.1.
Fig.2.
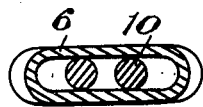
Fig.3.
Fig.4.
Fig.6.
Inventor:
Wm. H. Foley
By Egerton R. ...
Atty.

Patented July 1, 1941

2,247,806

UNITED STATES PATENT OFFICE 2,247,806

FISHHOOK

William Howard Foley, Toronto, Ontario, Canada

Application July 22, 1940, Serial No. 346,825
In Canada June 28, 1940

4 Claims. (Cl. 43—37)

This invention relates to fish-hooks, and the object of the invention is to provide a twin fish-hook which will be "sprung" by the fish as it strikes the bait so thereby to spread the hooks in the mouth of the fish and reduce to a minimum chances of losing it.

In its simplest form the invention consists of two fish-hooks formed from one piece of suitable spring wire, and a socket adapted to house the inner portions of said hooks and hold them in "set" position by frictional contact therewith. As a fish strikes the bait, the housed inner portions of the hooks are largely withdrawn from the socket and simultaneously the hooks are "sprung" apart within the mouth of the fish since by this movement they are freed of restraint normally exerted by the socket.

The socket performs the additional function of a coupling for the swivel or other device (not shown) to which the line (not shown) is usually attached. This socket is constructed so thereby to pivotally attach the twin hooks thereto as to allow abundant lateral movement thereof after the hooks have been "sprung."

Fig. 1 is an elevation of the invention in "set" position. Fig. 2 is an elevation showing the hooks "sprung." Fig. 3 is a cross-section on the line 3—3, Fig. 1. Fig. 4 is a cross-section on the line 4—4, Fig. 1. Fig. 5 is an edge view of the parts in the position shown in Fig. 1 and Fig. 6 is an enlarged view of the socket shown in Fig. 5.

In the drawing, like numerals of reference indicate the same parts.

The hooks 2 are formed substantially alike, and lie in the same plane. The barbed ends 3 are formed to face in opposite directions in the same plane and rest in contact when set. The said hooks are formed integrally from suitable spring wire, and are of substantially the same length, though not essentially so. At the upper or outer portion or end of the shanks is formed a bight 4.

The socket is numbered 6. As shown, it is provided with a large opening 7 in each side thereof, to reduce weight, and a hole 8 is formed at the inner end thereof to which a swivel or fish-hook (not shown) may be attached.

The shank of each hook is provided with a shoulder 9, in any suitable manner. This shoulder is preferably formed by suitably bending the wire. These shoulders are of course of substantially the same size, and the function thereof is to have frictional contact with the socket 6, and in combination with the socket, hold the hooks "set."

The form of socket shown substantially houses the inner portions of the shanks. When the parts are in the position shown in Fig. 1, these housed portions of the shanks are prevented from forward or rearward movements so thereby not to interfere with the efficient action of the hooks when "sprung." To prevent these movements, the bight 4 contacts interiorly with the socket 6, and parts of the divergent portions 10 of the shanks also contact or interiorly engage the socket.

To "set" the hooks, they are moved from the position shown in Fig. 2 into the position shown in Fig. 1. The user moves and holds the barbed ends 3 together and then telescopes the socket and the larger portions of the shanks of the hooks. As the inner portions of the shanks move into the socket 6, in due course the shoulders 9 are eased into frictional contact, with the help of the diverging portions 10 of the shanks, with the interior of the socket.

When a fish strikes the bait, the shoulders are drawn outwardly beyond the corners 12, and the spread of the hooks has started. As the outward movement of the hooks continues, the portions 10 also have frictional contact with the said shoulders for a portion of their length, but with a decreasing pressure until suddenly the resisting function of the socket 6 is removed completely and the hooks suddenly exert the maximum force to separate.

If desired, the bight 4 and portions of the inner portions of the shanks may have frictional contact interiorly with the socket 6, and thus co-act with the shoulders 9 to maintain the hooks in "set" position. To effect this purpose the interior of the socket 6 is tapered longitudinally transversely, as shown in Fig. 5. This tapered form of socket provides for increasing clearance between the housed portions of the shanks and the socket as the bight is moved towards the outer end of the socket. The construction provides for the minimum of friction between the parts at said outer end and thus ensures absence of any mechanical force originating in the device itself that would interfere with the spreading apart of the barbs 3.

Any suitable means may be used to couple twin fish-hooks to the socket 6. After the bight 4 has been inserted in the socket this coupling means is used. In the form of socket shown, which is made from a section of metal tubing somewhat flattened, the coupling means illustrated consists of a pin 13, passed through both sides of the socket, and set-up at each end to rivet it in place. Since this pin passes between the shanks 2, the twin fish-hooks are prevented from being withdrawn completely from the socket 6, through the contact of the bight 4, with said pin. This position of the said pin 13, and the absence of any side walls below the corners 12, permits free lateral movements of the fish-hooks.

The formation of the shoulders 9, or their equivalent, obviously offsets inwardly the portions of the shanks 2 below the said shoulders. This form permits these shank-portions to be brought substantially together when the device is "set," thus affording the widest possible spread thereof when "sprung."

Another advantage of "setting" the hooks close together is that they may be camouflaged in any suitable manner well known in the art for use in angling for all kinds of fish.

The socket 6 may be pressed or molded from any suitable plastic material.

The drawings in Figs. 1 and 2 show clearly that the opening in the bight 4 lies on the longitudinal axis of the twin hooks, and consequently this bight will readily engage the pin 13 and will be as readily disengaged therefrom. Furthermore this bight is merely formed by bending the wire from which the hooks are made, and hence no portion thereof overlaps itself.

What is claimed as the invention is:

1. In combination, a socket transversely internally tapered outwardly from its inner end, and having a pair of opposed corners located within the outer ends of the side walls thereof, a pair of laterally-positioned normally-separated integral fish-hooks formed from suitable spring wire and provided with a bight at the inner ends thereof, each hook consisting of an inner diverging shank-portion which terminates in a shoulder, the outer portion of each shank beyond its shoulder being offset inwardly and terminating each in an oppositely-disposed barb, the inner portions of said hooks being housed within said socket in frictional contact with the tapered interior thereof, and pivoting means so positioned in said outer ends that as the hooks are drawn outwardly frictional contact thereof with said socket progressively decreases and the shoulders of said hooks as they pass by said corners in contact therewith will ensure the spreading apart of the hooks and the bight will come into contact with said pivoting means and thereby position the inner end of the hooks to provide them with abundant lateral movement without hindrance from said corners and without the barbs contacting one another.

2. As a new article of manufacture, a pair of laterally-positioned fish-hooks formed from one piece of spring-wire and centrally longitudinally provided with a bight at the inner end thereof with its open side on the longitudinal axis of said hooks; each hook consisting of an inner portion diverging from said bight and terminating in a shoulder, the immediate portions of each hook from said shoulders converging sharply, and the outer portion of each hook from said sharply-converging portions widely diverging and each terminating in a barbed end oppositely faced to its fellow, all parts of the said hooks constantly lying in the same plane, said outer portions where said barbed ends proceed therefrom being adapted to contact when said hooks are "set."

3. In combination, a socket transversely internally tapered outwardly from its inner end and having a pair of opposed corners located within the outer ends of the side walls thereof; a pair of laterally-positioned normally-separated fish-hooks formed from suitable spring wire and provided with a bight at the inner end thereof with its open side on the longitudinal axis of said hooks, each hook consisting of an inner portion diverging from said bight and terminating in a shoulder, the immediate portions of each hook from said shoulders converging sharply, and the outer portion of each hook from said sharply-converging portions widely diverging and each terminating in a barbed end oppositely faced to its fellow, all parts of the said hooks constantly lying in the same plane, the inner portions of said hooks, in use, being housed within said socket, and pivoting means positioned in said outer end beyond said shoulders so that as the hooks are drawn outwardly the shoulders of the hooks as they pass said corners in contact therewith will ensure the spreading apart of the hooks and the free engagement of said bight with said pivoting means to thereby position the inner end of said hooks to provide them with abundant lateral movement without being constricted by said corners, because of the tapered internal formation of said socket the frictional contact of said hooks with the interior of said socket decreasing as the hooks are moved outward.

4. As a new article of manufacture, a socket transversely tapered between its wider side walls internally, the said side walls extending beyond the other side walls, the said walls where they join forming corners beyond which the extended portions of said wider walls extend the latter being each provided with a hole aligned with the other and located so that a line centrally longitudinally bisecting either wider wall will pass substantially centrally through its hole.

WILLIAM H. FOLEY.